US007142809B1

(12) United States Patent
Godwin

(10) Patent No.: US 7,142,809 B1
(45) Date of Patent: Nov. 28, 2006

(54) DEVICE AND METHOD TO LOCALLY FILL GAPS IN SPOTBEAM SATELLITE SYSTEMS WITH FREQUENCY RE-USE

(75) Inventor: John P. Godwin, Los Angeles, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 0 days.

(21) Appl. No.: 10/889,489

(22) Filed: Jul. 12, 2004

Related U.S. Application Data

(63) Continuation of application No. 09/796,781, filed on Feb. 27, 2001, now abandoned.

(51) Int. Cl.
*H04H 1/00* (2006.01)

(52) U.S. Cl. .................. 455/3.02; 455/3.06; 455/13.1; 455/13.2; 455/189.1; 455/209; 455/12.1; 455/427

(58) Field of Classification Search .............. 455/3.02, 455/3.06, 13.1, 13.2, 189.1, 209, 39, 12.1, 455/427
See application file for complete search history.

(56) References Cited

U.S. PATENT DOCUMENTS

| | | | |
|---|---|---|---|
| 3,581,209 A | 5/1971 | Zimmerman |
| 3,670,275 A | 6/1972 | Kalliomaki et al. |
| 4,064,460 A | 12/1977 | Gargini |
| 4,132,952 A | 1/1979 | Hongu et al. |
| 4,354,167 A | 10/1982 | Terreault et al. |
| 4,382,266 A | 5/1983 | Panzer |
| 4,397,037 A | 8/1983 | Theriault |
| 4,403,343 A | 9/1983 | Hamada |
| 4,509,198 A | 4/1985 | Nagatomi |
| 4,513,315 A | 4/1985 | Dekker et al. |
| 4,530,008 A | 7/1985 | McVoy |
| 4,532,543 A | 7/1985 | Groenewegen |
| 4,538,175 A | 8/1985 | Balbes et al. |
| 4,545,075 A | 10/1985 | Miller et al. |
| 4,556,988 A | 12/1985 | Yoshisato |

(Continued)

FOREIGN PATENT DOCUMENTS

EP 0 288 928 11/1988

(Continued)

OTHER PUBLICATIONS

Mussino, F., "Reception and distribution techniques for DBS signals in community antenna installations," Accession No. 2781941, Alta Frequenza, 55(2):105-11, Mar.-Apr. 1986.

(Continued)

*Primary Examiner*—Marceau Milord
(74) *Attorney, Agent, or Firm*—Georgann S. Grunebach

(57) ABSTRACT

Systems and methods for transmitting and receiving diverse signals across regions using a minimum of frequency capacity and maintaining compatibility with the heritage system. A system of the invention comprises at least one broadcast transmitter for transmitting a broadcast signal in a first frequency band to a receiver, at least one gapfiller transmitter for transmitting a gapfiller signal in a second frequency band to the receiver and at least one set of reuse transmitters for transmitting a plurality of spotbeam signals in the first frequency band to define coverage regions and at least one coverage gap where the spotbeam signals are not transmitted. A method of the invention comprises receiving a first signal, receiving a second signal, generating a first intermediate frequency (IF) signal from the first signal, generating a second IF signal from the second signal, filtering the second IF signal to produce a filtered second IF signal and combining the filtered second IF signal and the first IF signal.

5 Claims, 4 Drawing Sheets

U.S. PATENT DOCUMENTS

| | | | |
|---|---|---|---|
| 4,592,093 A | 5/1986 | Ouchi et al. | |
| 4,608,710 A | 8/1986 | Sugiura | |
| 4,628,506 A | 12/1986 | Sperlich | |
| 4,663,513 A | 5/1987 | Webber | |
| 4,667,243 A | 5/1987 | Blatter et al. | |
| 4,672,687 A | 6/1987 | Horton et al. | |
| 4,675,732 A | 6/1987 | Oleson | |
| 4,710,972 A | 12/1987 | Hayashi et al. | |
| 4,723,320 A | 2/1988 | Horton | |
| 4,761,825 A | 8/1988 | Ma | |
| 4,761,827 A | 8/1988 | Horton et al. | |
| 4,785,306 A | 11/1988 | Adams | |
| 4,802,239 A | 1/1989 | Ooto | |
| 4,805,014 A | 2/1989 | Sahara et al. | |
| 4,813,036 A | 3/1989 | Whitehead | |
| 4,823,135 A | 4/1989 | Hirashima et al. | |
| 4,866,787 A | 9/1989 | Olesen | |
| 4,876,736 A | 10/1989 | Kiewit | |
| 4,903,031 A | 2/1990 | Yamada | |
| 4,945,410 A | 7/1990 | Walling | |
| 5,010,400 A * | 4/1991 | Oto | 725/68 |
| 5,014,350 A * | 5/1991 | Nezu | 455/258 |
| 5,027,430 A | 6/1991 | Yamauchi et al. | |
| 5,068,918 A | 11/1991 | Verheijen et al. | |
| 5,073,930 A | 12/1991 | Green et al. | |
| 5,119,509 A | 6/1992 | Kang | |
| 5,235,619 A | 8/1993 | Beyers, II et al. | |
| 5,249,043 A | 9/1993 | Grandmougin | |
| 5,253,058 A * | 10/1993 | Gharavi | 375/240.12 |
| 5,276,904 A | 1/1994 | Mutzig et al. | |
| 5,289,272 A | 2/1994 | Rabowsky et al. | |
| 5,301,352 A | 4/1994 | Nakagawa et al. | |
| 5,382,971 A | 1/1995 | Chanteau | |
| 5,437,051 A * | 7/1995 | Oto | 455/3.02 |
| 5,440,587 A * | 8/1995 | Ishikawa et al. | 375/332 |
| 5,565,805 A | 10/1996 | Nakagawa et al. | |
| 5,574,964 A | 11/1996 | Hamlin | |
| 5,587,734 A | 12/1996 | Lauder et al. | |
| 5,649,318 A | 7/1997 | Lusignan | |
| 5,760,819 A | 6/1998 | Sklar et al. | |
| 5,787,335 A | 7/1998 | Novak | |
| 5,790,202 A | 8/1998 | Kummer et al. | |
| 5,790,939 A * | 8/1998 | Malcolm et al. | 455/13.2 |
| 5,838,740 A | 11/1998 | Kallman et al. | |
| 5,883,677 A | 3/1999 | Hofmann | |
| 5,905,941 A | 5/1999 | Chanteau | |
| 5,914,942 A * | 6/1999 | Hassan et al. | 370/316 |
| 5,936,660 A | 8/1999 | Gurantz | |
| 5,959,592 A | 9/1999 | Petruzzelli | |
| 6,072,786 A * | 6/2000 | Wang et al. | 370/324 |
| 6,094,236 A * | 7/2000 | Abe et al. | 348/731 |
| 6,100,883 A | 8/2000 | Hoarty | |
| 6,173,178 B1 * | 1/2001 | Hammill et al. | 455/429 |
| 6,181,932 B1 * | 1/2001 | Kolev et al. | 455/428 |
| 6,195,037 B1 * | 2/2001 | Gross et al. | 342/354 |
| 6,198,449 B1 | 3/2001 | Muhlhauser et al. | |
| 6,219,528 B1 * | 4/2001 | Wright et al. | 455/13.4 |
| 6,256,496 B1 * | 7/2001 | Dintelmann et al. | 455/427 |
| 6,272,317 B1 * | 8/2001 | Houston et al. | 455/13.1 |
| 6,304,618 B1 | 10/2001 | Hafeez et al. | |
| 6,314,269 B1 * | 11/2001 | Hart et al. | 455/12.1 |
| 6,397,038 B1 | 5/2002 | Green, Sr. et al. | |
| 6,414,944 B1 * | 7/2002 | Kolev et al. | 370/316 |
| 6,430,167 B1 * | 8/2002 | Falk | 370/325 |
| 6,430,233 B1 | 8/2002 | Dillon et al. | |
| 6,430,742 B1 | 8/2002 | Chanteau | |
| 6,441,797 B1 | 8/2002 | Shah | |
| 6,452,991 B1 | 9/2002 | Zak | |
| 6,501,938 B1 * | 12/2002 | Suenaga et al. | 455/3.02 |
| 6,510,152 B1 | 1/2003 | Gerszberg et al. | |
| 6,535,717 B1 * | 3/2003 | Matsushima et al. | 455/18 |
| 6,549,582 B1 | 4/2003 | Friedman | |
| 6,574,235 B1 | 6/2003 | Arslan et al. | |
| 6,598,231 B1 | 7/2003 | Basawapatna et al. | |
| 6,600,897 B1 | 7/2003 | Watanabe et al. | |
| 6,668,158 B1 * | 12/2003 | Tsutsui et al. | 455/12.1 |
| 6,865,193 B1 | 3/2005 | Turk | |
| 2001/0055319 A1 | 12/2001 | Quigley et al. | |
| 2002/0044614 A1 | 4/2002 | Molnar | |
| 2002/0154620 A1 | 10/2002 | Azenkot et al. | |
| 2003/0185174 A1 | 10/2003 | Currivan | |
| 2004/0136455 A1 | 7/2004 | Akhter et al. | |
| 2004/0153942 A1 | 8/2004 | Shtutman et al. | |
| 2004/0161031 A1 | 8/2004 | Kwentus et al. | |
| 2004/0244059 A1 | 12/2004 | Coman | |
| 2004/0255229 A1 | 12/2004 | Shen et al. | |

FOREIGN PATENT DOCUMENTS

| | | |
|---|---|---|
| GB | 2 127 257 | 4/1984 |
| JP | 57193190 | 11/1982 |
| JP | 59-211380 | 11/1984 |
| JP | 60153225 | 8/1985 |
| JP | 60165832 | 8/1985 |
| JP | 61195094 | 8/1986 |
| JP | 61238130 | 10/1986 |
| JP | 62026933 | 2/1987 |
| JP | 62-279785 | 12/1987 |
| JP | 62279785 | 12/1987 |
| JP | 63016734 | 1/1988 |
| JP | 63059233 | 3/1988 |
| JP | 02054637 | 8/1988 |
| JP | 63202136 | 8/1988 |
| JP | 02140022 | 11/1988 |
| JP | 63309032 | 12/1988 |
| JP | 01-255389 | 10/1989 |
| JP | 01-256823 | 10/1989 |
| JP | 2140022 | 5/1990 |
| JP | 02209026 | 8/1990 |
| JP | 03058521 | 3/1991 |
| JP | 2001-231033 | 2/2000 |
| JP | 2001237752 | 8/2001 |
| JP | 2003339030 | 11/2003 |
| WO | WO 03094520 | 11/2003 |

OTHER PUBLICATIONS

Mussino, F., "Evolution of the receiving and distribution installations of television signals: from terrestrial broadcasting to satellite broadcasting," Accession No. 2742699, Proc. Of the 32$^{nd}$ Congress on Electronics: Satellite Broadcasting, 243-50, 1985—Abstract Only.

Mussino, F., "The reception of direct broadcast satellite TV signals in the 12 GHz band, using the C-MAC packet system," Accession No. 2325813, Elettronica e Telecomunicazioni, 33(3):117-30, May-Jun. 1984.

Mussino, F., "Centralized aerial systems [cable TV]," Accession No. 2306051, Radioindustria Elettronica—Televizione, 7(11):491-4, Nov. 1983—Abstract Only.

Chaplin, J.G., et al., "Satellite broadcast reception: the FM approach to signal distribution in individual and community antenna systems," Accession No. 2241798, EBU Review, Technical No. 202:274-81, Dec. 1983—Abstract Only.

Mussino, F., "Cabled distribution systems: wide-band and channelized reception methods," Accession No. 2207325, Elettronica e Telecomunicazoni, 32(5):229-33, Sep.-Oct. 1983—Abstract Only.

Mussino, F., "Intermodulation characteristics of the television broadcast satellite receivers," Accession No. 2095285, Alta Frequenza 52(2):118-25, Mar.-Apr. 1983, Abstract Only.

Mussino, F., "Some problems of television reception," Accession No. 1850235, Elettronica e Telecommunicazioni, 30(4):165-70, Jul.-Aug. 1981, Abstract Only.

Bava, G. et al., "Characteristics and structure of receivers for direct TV radiodiffusion by satellite in the 12 GHz band," Accession No. 1512676, Alta Frequenza, 48(12):714-25, Dec. 1979, Abstract Only.

Mussino, F., "Synchronous demodulator for television signals," Accession No. 1497282, Elettronica e Telecomunicazioni, 28(3):101-7, May-Jun. 1979, Abstract Only.

Mussino, F., "Windscreen antenna," Accession No. 1315746, Alta Frequenza, 47(10):720-7, Oct. 1978, Abstract Only.

Mussino, F., "Characteristics and problems with centralised antennae," Accession No. 1290455, Radioindustria Elettronica—Televizione 4:203-8, Apr. 1978, Abstract Only.

Mussino, F., "EMC measurements on the electrical equipment of cars," Accession No. 1117953, 2nd symposium and technical exhibition on electromagnetic compatibility, 131-3, 1977, Abstract Only.

Mussino, F., "RF impedance of the electrical network of cars," Accession No. 1000748, International Symposium on Electromagnetic Compatibility, 418-23, 1976, Abstract Only.

Beccari, C. et al, "All-pass networks with constant phase difference," Accession No. 980800, Elettronica e Telecomunicazioni, 25(3):117-22, May-Jun. 1976, Abstract Only.

Mussino, F., "Measuring methods for CATV systems proposed by IEC," Accession No. 945815, Elettronica e Telecomunicazioni, 25(1):29-34, Jan.-Feb. 1976, Abstract Only.

Mussino, F., "Characteristics of CATV systems proposed by IEC," Accession No. 909134, Elettronica e Telecomunicazioni, 24(6):243-5, Nov.-Dec. 1975, Abstract Only.

Mussino, F., "Antenna amplifier for field strength measurements on wide frequency band," Accession No. 544273, Elettronica e Telecomunicazioni, 22(2):49-52, Mar.-Apr. 1973, Abstract Only.

Mussino, F., "FM receiver with coherent demodulation," Accession No. 320402, Elettronica e Telecomunicazioni, 20(4):133-7, 1971, Abstract Only.

Mussino, F., "Coherent detection receivers for radio and television broadcasting," Accession No. 273689, Elettronica e Telecomunicazioni, 20(2):57-69, Mar.-Apr., 1971, Abstract Only.

Mussino, F. et al., "Stereophonic transmission system using double carrier modulation," Accession No. 208381, Proceedings of the 17th international congress on electronics, 415-21, 1970, Abstract Only.

Mussino, F., "A means of continuously varying phase," Accession No. 89438, Elettronica e Telecomunicazioni, 18(4):118-24, Jul. 1969, Abstract Only.

Carrillo, J.A. et al., "Stereophonic receptioin noise figure of 'pilot frequency' systems," Accession No. 22497, Elettroncia e Telecomunicazioni, 17(5):162-6, Sep. 1968, Abstract Only.

Di Zenobio, D. et al., "A switching circuit scheme for a satellite site diversity system," Accession No. 3316999, 1998 IEEE International Symposium on Circuits and Systems. Proceedings (Cat. No. 88CH2458-8), 1:119-22, Abstract Only.

Holtstiege, H., "Satellite reception-tips and tricks of an expert," Accession No. 3132408, Funkschau, 4:57-8, 61-2, Feb. 12, 1988, Abstract Only.

Cominetti, M. et al., "Distribution of DBS signals of the MAC-family in collective antenna systems," Accession No. 3117800, New Systems and Services in Telecommunications, III: Networks, Cables, Satellites—The What, the How, the Why? Proceedings of the Third International Conference: 417-25, 1987, Abstract Only.

O'Neill, H.J. et al., "The distibution of C-MAC in cable systems," Accession No. 2856976, Cable Television Engineering, 13(7):294-301, Dec. 1986, Abstract Only.

Lowell, R.R. et al., "NASA's communication program examined for the 1980s and 1990s. I," Accession No. 2801869, MSN Microwave Systems News & Communications Technology, 16(9):79-81, 83-5, 87-8, 90, Aug. 1986, Abstract Only.

Kudsia, C.M. et al., "RF channel characteristics and enhanced performance in future DBS satellites at 12 GHz in Region 2," Accession No. 2759373, AIAA 11th Communication Satellite Systems Conference. Collection of Technical Papers: 220-4, 1986, Abstract Only.

Baker, S., "Eutelsat in the 90s" Accession No. 2569799, Cable & Satellite Europe, 7:9-12, Jul. 1985, Abstract Only.

Hessenmuller, H., "The progess towards a unified colour television standard for satellite broadcasting in Europe," Accession No. 2569494, Fernmelde-Ingenieur, 39(8):1-36, Aug. 1985, Abstract Only.

Sultan, N. et al., "Reconfigurable dual feed antenna for direct broadcast satellites," Accession No. 2496781, Acta Astronautica, 12(1):27-35, Jan. 1985, Abstract Only.

Gandy, C., "Antenna requirements and design options for DBS domestic reception," Accession No. 2358182, IBC 84. International Broadcasting Convention (Proceedings No. 240): 251-3, 1984, Abstract Only.

Renton, C., "RCA satcom Ku-band antenna system," Accession No. 2867860, AP-S International Symposium 1986. 1986 International Symposium Digest Antennas and Propagation (Cat. No. 86CH2325-9) 1:157-60, 1986, Abstract Only.

Sultan, N. et al., "A reconfigurable multiple shaped beam reflector antenna for direct broadcast satellite," Accession No. 2079246, Third International Conference on Antennas and Propagation ICAP 83: 203-7, pt. 1, 1983, Abstract Only.

Palumbo, B., "Dual polarized two-frequence slot array for a satellite electronically despun antenna," Accession No. 184451, 1969 European microwave conference: 147, 1970, Abstract Only.

Lenormand, R. et al., "CAD for HERMES antennas," Accession No. 3317368, AP-S Intenational Symposium 1988. 1988 International Symposium Digest: Antennas and Propagation (Cat. No. 88CH2563-5): 1:26-9, 1988, Abstract Only.

Naderi, F.M., "ACTS: the first step toward a switchboard in the sky," Accession No. 3190134, Telematics and Informatics, 5(1):13-20, 1988, Abstract Only.

Noda, H. et al., "Satellite TV receiving system," Accession No. 3152051, JRC Review, 26:45-50, 1988, Abstract Only.

Binder, R. et al., "The multiple satellite system-low altitude survivable communications," Accession No. 3095999, MILCOM 87: 1987 IEEE Military Communications Conference. 'Crisis Communications: The Promise and Reality'. Conference Record (Cat. No. 87CH2493-5), 2:620-5, 1987, Abstract Only.

Hori, T. et al., "Electronically steerable spherical array antenna for mobile earth station," Accession No. 2935203, Fifth International Conference on Antennas and Propagation (ICAP 87) (Conf. Publ. No. 274), 1:55-8, 1987, Abstract Only.

Yamamoto, H. et al., "Communications equipment for multibeam satellites," Accession No. 2727289, Telecommunication technologies 1985/1986: 109-18, 1985, Abstract Only.

Thurl, W. et al., "Satellite receiving station for TV programme distribution," Accession No. 2480868, Mikrowellen Magazin, 10(6):604-6, Dec. 1984, Abstract Only.

Alaria, G.B. et al., "SS/TDMA satellie system with on board TST switching stage," Accession No. 2342421, CSELT Rapporti Tecnici, 12(3):247-55, Jun. 1984, Abstract Only.

Kudrna, K., "Preliminary test results of the electronic switching spherical array antenna," Accession No. 2324225, ITC/USA/'83. International Telemetering Conference: 11-17, 1983, Abstract Only.

Vidal Saint-Andre, B. et al., "A multi-element primary feed system and associated switch device designed for TDMA communicatioin satellites," Accession No. 2290842, Annales des Telecommunications, 39(1-2):76-83, Jan.-Feb. 1984, Abstract Only.

Bongiovanni, G., et al., "Optimal switching algorithm for multibeam satellite systems with variable bandwidth beams," Accession No. 2258153, IBM Technical Disclosure Bulletin, 26(8):4344-8, Jan. 1984, Abstract Only.

Saint-Andre, B.V., et al., "A multi-element primary feed system and associated switch device designed for TDMA communications satellites," Accession No. 2257271, GLOBECOM '83. IEEE Global Telecommunications Conference. Conference Record: 3:1645-9, 1983, Abstract Only.

Spisz, E.W., "NASA development of a satellite switched SS-TDMA IF switch matrix," Accession No. 2241614, CECON '83 Record: Cleveland Electrical/Electronics Conference and Exposition 1983: 19-27, Nov. 1983, Abstract Only.

Kudrna, K. et al., "The Electronica Switching Spherical Array (ESSA) antenna for the Earth Radiation Budget Spacecraft (ERBS)," Accession No. 2148187, ITC/USA/'82. International Telemetering Conference, 271-88, 1982, Abstract Only.

Kumagai, H. et al., "20 GHz band receiving facilities at sub-earth-station for CS site diversity switching experiments," Accession No. 2147104, Review of the Radio Research Laboratories, 28(147):553-60, Sep. 1982, Abstract Only.

Kennedy, W.A., "UHE airborne satcom antenna systems," Accession No. 2111199, Midcon/80 Conference Record: 8/1/1-6, 1980, Abstract Only.

Grant, I. et al., "The SKYSWITCH project," Accession No. 2111056, Telecommunications, 17(1):80, 88, Jan. 1983, Abstract Only.

King-tim, Ko et al., "A space-division multiple-access protocol for spot-beam antenna and satellite-switched communication network," Accession No. 2079577, IEEE Journal on Selected Areas in Communications, vol. SAC-1, No. 1:126-32, Jan. 1983, Abstract Only.

Farrell, P.G., "Modulation and coding," Accession No. 2464817, International Journal of Satellite Communications, 2(4):287-304, Oct.-Dec. 1984, Abstract Only.

Beach, M.A. et al., "An adaptive antenna array for future land mobile satellite terminals," Accession No. 3416971, Sixth International Conference on Antennas and Propagation (ICAP 89) (Conf. Publ. No. 301), 1:326-30, 1989, Abstract Only.

Johannsen, K.G., "Ground station tracking of dual linearly polarized satellites," Accession No. 922037, IEEE Transactions on Aerospace and Electronic Systems, vol. AED-11, No. 6: 1333-45, Nov. 1975, Abstract Only.

Harvey,. R.V., "Simplifying the planning of frequency assignments for satellite broadcasting," Accession No. 1069917, EBU Review, Technical 159:218-26, Oct. 1976, Abstract Only.

Nakagawa, M., "Satellite broadcasting in Japan," Accession No. 3473565, AEU 3:50-3, 1989, Abstract Only.

Vuong, X.T. et al., "Some practical strategies for reducing intermodulation in satellite communications," Accession No. 3401833, IEEE Transactions on Aerospace and Electronica Systems, 24(6):755-65, Nov. 1988, Abstract Only.

Poulton, G.T. et al., "Earth-station antennas for multiple satellite access," Accession No. 3352237, Journal of Electrical and Electronics Engineering, Australia, 8(3):168-76, Sep. 1988, Abstract Only.

Alper, A.T., "Capacity allocation in a multi-transponder communications satellite with a common reconfigurable multiple-beam antenna," Accession No. 1790796, IEEE 1981 International Conference on Communications, 54.5/1-5, vol. 3, 1981, Abstract Only.

Matsushita, M. et al., "Some considerations on achieving optimum receiving systems for satellite broadcasting," Accession No. 306770, Proceedings of the 8th international symposium on space technology and science, 719-25, 1969, Abstract Only.

Lewis, V., "SMATV-Phase 1-updating MATV systems (UK)," Electronic Technology 23(1):10-15, Jan. 1989, Accession No. 3392948, Abstract Only.

Keen, K.M. et al., "Techniques for the measurement of the cross-polarisation radiation patterns of linearly polarised, polarisation-diversity satellite ground-station antennas," Accession No. 1933335, IEE Proceedings H (Microwaves, Optics and Antennas) 129(3):103-8, Jun. 1982, Abstract Only.

DiFonzo, D.F., "Antennas: Key to communications satellite growth," Accession No. 1279523, Microwave Systems News 8(6):83-5, 87, 90-1, June 1, 1978, Abstract Only.

Dement, D.K., "NASA's revitalized role in satellite communications," Accession No. 1527953, IEEE Communications Magazine, 18(1):37-41, Jan. 1980, Abstract Only.

Kalliomaki, K. et al., "Electronically tracking antenna system for satellite reception," Accession No. 150587, IEEE Transactions on Aerospace and Electronic Systems, vol. AES-6, No. 3:405-7, May 1970, Abstract Only.

Inoue, T. et al., "30/20 GHz band SCPC satellite communication using small earth stations," Accession No. 2191343, IEEE Journal on Selected Areas in Communications, vol. SAC-1, No. 4:600-8, Sep. 1983, Abstract Only.

Jacobs, I.M. et al., "Trends in military satellite communication networks," Accession No. 1611408, AIAA 8th Communications Satellite Systems Conference 762-5, 1980, Abstract Only.

Davies, R. et al., "Packet communications in satellites with multiple-beam antennas and signal processing," Accession No. 1611382, AIAA 8th Communications Satellite Systems Conference, 378-85, 1980, Abstract Only.

Raymond, H.G. et al., "An advanced mixed user domestic satellite system architecture," Accession No. 1611364, AIAA 8th Communications Satellite Systems Conference, 148-53, 1980, Abstract Only.

Pennoni, G. et al., "An SS-TDMA satellite system incorporating an onboard time/space/time switching facility: overall system characteristics and equipmnet description," Links for the Future. Science, Systems & Services for Communications. Proceedings of the International Conference on Communications-ICC 84, 2:800-6, 1984, Abstract Only.

Greborio, G.B., "Direct Satellite Television: Distribution System for New Centralized Antenna Installations," Electronics and Telecommunications, 6:271-284, 1984.

Chaplin, J.G. et al., "Satellite broadcast reception: the FM approach to signal distribution in individual and community antenna systems," EBU Review, Technical No. 202, Dec. 1983, 11 pgs.

Sharifi, M.H. et al., "A Multiple Access Technique for Centralized Multiple Satellite Networking with On-Board Processing in the Central Node," IEEE, 1012-1021, 1988.

Schmidt, R.L. et al., "Transmission of Two NTSC Color Television Signals Over a Single Satellite Transponder Via Time-Frequency Multiplexing," IEEE Transactions on Communications, vol. Com-31, 11:1257-1266, Nov. 1983.

Pfund, E.T., "Direct Television Broadcasting with a Medium-Size Satellite," IEEE, 121-129, 1988.

Lee, L-S., "A Polarization Control System for Satellite Communications with Multiple Uplinks," IEEE Transactions on Communcations, vol. Com-26, No. 8, 1201-1211, Aug. 1978.

Naderi, F.M., "Advance Satellite Concepts for Future Generation VSAT Networks," IEEE Communications Magazine, 13-22, Sep. 1988.

Granlund, J. et al., "Diversity Combining for Signals of Different Medians," IRE Transactions on Communications Systems, 138-145, 1961.

Davies, P.G. et al., "Measurements of SIRIO Transmissions near 11.6 GHz at Slough (UK)," Alta Frequenza, 332-158 E—338-164 E, 1979.

Chakraborty, D., "Survivable Communication Concept Via Multiple Low Earth-Orbiting Satellites," IEEE Transactions on Aerospace and Electronic Systems, 25(6):879-889, Nov. 1989.

Buntschuh, R.F., "First-Generation RCA Direct Broadcast Satellites," IEEE Journal on Selected Areas in Communications, vol. SAC-3, No. 1, 126-134, Jan. 1985.

Bridle, M., "Satellite Broadcasting in Australia," IEEE Transactions on Broadcasting, vol. 34, No. 4, 425-429, Dec. 1988.

Bertossi, A.A. et al., "Time Slot Assignment in SS/TDMA Systems with Intersatellite Links," IEEE Transactions on Communications, vol. Com-35, No. 6, 602-608, Jun. 1987.

Stephens, G.M., "European DBS: On the Brink," Satellite Communications, Jul. 1988.

Weinberg, A., "On the Passaage of High-level Pulsed Radio Frequency Interference Through a Nonlinear Satellite Transponder," IEEE Transactions on Communciations, vol. Com-32, No. 1, 13-24, Jan. 1984.

Tasaka, S., "The SRUC Protocol for Satellite Packet Communication—A Performance Analysis," IEEE Transactions on Communications, vol. Com-34, No. 9, 937-945, Sep. 1986.

Seth, A.K., "Satellite Communication Experiments in the Country," J. Instn. Electronics & Telecom. Engrs., 28(5):199-207, 1982.

Saleh, A.A.M. et al., "Distributed Antennas for Indoor Radio Communications," IEEE Transactions on Communications, vol. Com-35, No. 12, 1245-1251, Dec. 1987.

Jeruchim, M.C., "On the Application of Importance Sampling to the Simulation of Digital Satellite and Multihop Links," IEEE Transactions on Communications, vol. Com-32, No. 10, 1088-1104, Oct. 1984.

Kavehrad, M., "Direct-Sequence Spread Spectrum with DPSK Modulation and Diversity for Indoor Wireless Communications,"IEEE Transactions on Communications, vol. Com-35, No. 2, 224-241, Feb. 1987.

Mosely, J. et al., "A Class of Efficient Contention Resolution Algorithms for Multiple Access Channels," IEEE Transactions on Communications, vol. Com-33, No. 2, 145-151, Feb. 1985.

Jain, C.L. et al., "A Direct Reception System for Time Synchronization Via InSat-1," J. Instn. Electronics & Teleom. Engrs, 27(10):470-476, 1981.

Gopal, I.S., et al., "Scheduling in Multibeam Satellites with Interfering Zones," IEEE Transactions on Communciations, vol. Com-31, No. 8, 941-951, Aug. 1983.

Gopal, I.S. et al., "Point-to-Multipoint Communication Over Broadcast Links," IEEE Transactions on Communciations, vol. Com-32, No. 9, 1034-1049, Sep. 1984.

Gole, P. et al., "Effect of Ice-Induced Cross-Polarization on Digital Earth-Space Links," IEEE Transactions on Communciations, vol. Com-32, No. 1, 70-81, Jan. 1984.

Jacobs, I.M. et al., "Trends in Military Satellite Communication Networks," American Institute of Aeronautics and Astronautics, Inc., 762-765, 1980.

Glance, B. et al., "Frequency-Selective Fading Effects in Digital Mobile Radio with Diversity Combining," IEEE Transactions on Communications, vol. Com-31, No. 9, 1085-1094, Sep. 1983.

Cox, D.C., "Antenna Diversity Performance in Mitigating the Effects of Portable Radiotelephone Orientation and Multipath Propagation," IEEE Transactions on Communciations, vol. Com-31, no. 5, 620-628, May 1983.

Cimini, Jr., L.J., "Analysis and Simulation of a Digital Mobile Channel Using Orthogonal Frequency Division Multiplexing," IEEE Transactions on Communications, vol. Com-33, No. 7, 665-675, Jul. 1985.

Cartledge, J.C., "Outage Performance of QAM Digital Radio Using Adaptive Equalization and Switched Space Diversity Reception," IEEE Transactions on Communciations, vol. Com-35, No. 2, 166-180, 1987.

Kudsia, C.M., et al., "RF channel characteristics and enhanced performance in future DBS satellites at 12 GHz in Region 2," AIAA 11$^{th}$ Communication Satellite Systems Conference. Collection of Technical Papers: 220-4, 1986, Accession Number 2759373 (ABSTRACT).

Binder, R. et al., "Crosslink architectures for a multiple satellite system," Proceedings of the IEEE, vol. 75, No. 1: 74-82, Jan. 1987, Accession No. 2883355 (ABSTRACT).

Dubrovnik, International Telecommunication Union, Recommendations and Reports of the CCIR, 1986, CCIR Report 473-4, pp. 190-211 (see 198-200, 204)—XVIth Plenary Assembly, 1986—vols. X and XI—Part 2, Broadcasting Satellite Service (Sound and Television).

* cited by examiner

| Channel | | 4 | 12 | 18 | 20 | 26 | 28 |
|---|---|---|---|---|---|---|---|
| Spotbeam Frequencies (MHz) | Ku Center Frequency | 12,267.74 | 12,384.38 | 12,471.86 | 12,501.02 | 12,588.50 | 12,617.66 |
| | IF Center Frequency | 1,017.74 | 1,134.38 | 1,221.86 | 1,251.02 | 1,338.50 | 1,367.66 |
| Inserted Frequencies (MHz) | Ka Center Frequency | 17,892.40 | 18,009.04 | 18,096.52 | 18,125.68 | 18,213.16 | 18,242.32 |
| | IF Center Frequency | 1,017.40 | 1,134.04 | 1,221.52 | 1,250.68 | 1,338.16 | 1,367.32 |

FIG. 2

DEVICE AND METHOD TO LOCALLY FILL GAPS IN SPOTBEAM SATELLITE SYSTEMS WITH FREQUENCY RE-USE

This application is a continuation of U.S. application Ser. No. 09/796,781 filed Feb. 27, 2001, now abandoned, the entire contents of which are incorporated herein by reference.

BACKGROUND OF THE INVENTION

1. Field of the Invention

The present invention relates to systems and methods for improving the capacity of transmit and receive systems, and in particular to a system and method for improving transmission capacity in satellite broadcast systems.

2. Description of the Related Art

Systems which transmit and receive signals via electromagnetic radiation must deliver those signals to users without interference. Limited available electromagnetic spectrum requires such systems to maximize the use of available spectrum. Often, the optimum solution to maximize spectrum use is driven by the particular application. In addition, the optimum solution may change as the delivered services change. In this case, the problem may be further complicated if maintaining compatibility with heritage devices is desirable.

For mass market broadcast systems, the base of installed receivers represents a significant investment in the system infrastructure. It is extremely important to be able to expand services to receivers at a low cost and with a minimum of disruption.

Current transmit and receive systems, such as those using satellites, often employ a principle of frequency re-use enabled by spatial isolation. A particular channel may only deliver a particular signal to a particular geographic region. A frequency can be used to transmit this signal in one region and simultaneously the same frequency can be "re-used" to transmit a different signal in a different region. No interference will occur as long as there is adequate spatial separation between the signals, i.e. signals intended for reception in one geographical area are not received in other geographical areas.

Spotbeams and frequency re-use techniques can be used to provide unique services to specific coverage regions (e.g. the entire west coast of the United States or only Los Angeles), while services common to all regions are provided via conventional satellite broadcast to multiple geographical areas (e.g. the entire continental United States (CONUS)).

Spotbeam satellite systems thus increase the total capacity transmitted on a given RF frequency channel. However, such systems reduce the capacity delivered to a given user because the total number of RF channels used for CONUS capacity is reduced when channels are assigned to spotbeam use.

There is a need for new systems that can fill this capacity shortfall. There is also a need for systems that can accommodate expanding services (e.g. through the use of spot beams) while maintaining compatibility with the legacy, non-spot beam system receivers. Further, there is a need for devices which allow new services to be implemented with only minor modifications to existing customer installations. The present invention satisfies these needs.

SUMMARY OF THE INVENTION

To address the requirements described above, the present invention discloses a system, device and method for transmitting and receiving diverse signals across regions with improved frequency re-use (i.e. a minimizing frequency use) and without affecting expensive existing infrastructure.

A typical system of the invention comprises at least one broadcast transmitter for transmitting a broadcast signal in a first frequency band to a receiver, at least one gapfiller transmitter for transmitting a gapfiller signal in a second frequency band to the receiver and at least one set of reuse transmitters for transmitting a plurality of spotbeam signals in the first frequency band to define coverage regions and at least one coverage gap where the spotbeam signals are not transmitted. The gapfiller signals are typically transmitted within the coverage gaps but in some applications may provide gapfiller capacity within the spotbeam regions as well.

A typical reception device of the invention comprises a first feed, a second feed, a local oscillator producing a reference frequency, a first multiplier coupled to the local oscillator for multiplying the reference frequency by a first factor and coupled to the first feed producing a first intermediate frequency (IF) signal, a second multiplier coupled to the local oscillator for multiplying the reference frequency by a second factor and coupled to the second feed producing a second IF signal, a filter for filtering the second IF signal producing a filtered IF signal and a combiner for combining the filtered IF signal and the first IF signal. After additional processing, the combined signal is provided to a "legacy" receiver which was originally intended to receive and decode transmissions from only the first frequency band.

A typical method of the invention comprises receiving a first signal, receiving a second signal, generating a first intermediate frequency (IF) signal from the first signal, generating a second IF signal from the second signal, filtering the second IF signal to produce a filtered second IF signal and combining the filtered second IF signal and the first IF signal. Additional processing may be performed to prevent interference between signals at the same IF frequency.

The foregoing allows transmitting and receiving diverse signals across regions using a minimum of frequency. Furthermore, the invention expands the capacity available to a given subscriber region without changing the receiver. The low noise block (LNB)/combiner device installation involves only relatively inexpensive changes to the outdoor electronics.

BRIEF DESCRIPTION OF THE DRAWINGS

Referring now to the drawings in which like reference numbers represent corresponding parts throughout:

FIG. 2 is a frequency table of a typical embodiment of the invention;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
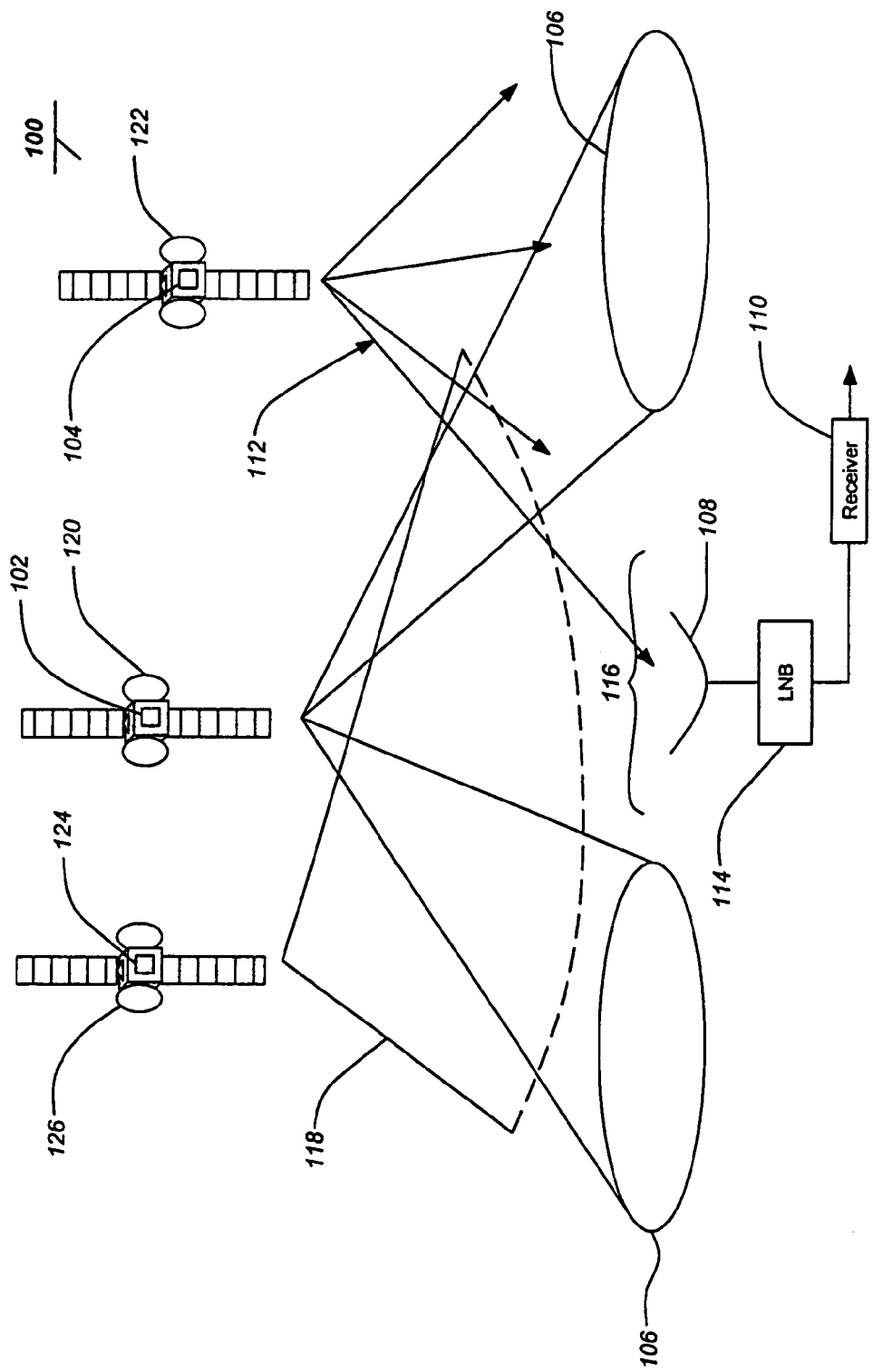
FIG. 1 is a diagram illustrating an embodiment of the invention.

FIG. 1 is a diagram illustrating an embodiment of a transmission system 100 of the invention. At least one set of reuse transmitters 102, such as on a satellite 120 or other platform, generates a plurality of spotbeams signals 106 in a first frequency band producing a plurality of coverage regions with at least one coverage gap 116. The spotbeam signals 106 are in addition to the ordinary CONUS signal 118 transmitted from the first satellite 126 or another satellite 120 which may be in the same first frequency band. Gapfiller transmitters 104, which may be located on the first satellite 120 or platform or a separate satellite 122 or platform produce gapfiller signals 112 in a second frequency band within the coverage gap 116 or within one of the spotbeams 106. An antenna 108, such as a satellite dish, receives the gapfiller signal 112 along with the ordinary CONUS broadcast signal 118 and communicates these signals to one or more LNB/combiner 114. The LNB/combiner 114 may then preprocess the gapfiller signal 112 with the CONUS signal 118 and the combined signal is then communicated to the receiver 110 which may decode the combined signal for the user. The particular functions of the LNB/combiner shall be detailed below.

In a typical embodiment of a system of the invention the first set of reuse transmitters 102 are disposed on a satellite 120 and the second transmitter 104 is disposed on a separate satellite 122. However, the system may also be implemented with all transmitters 102, 104 disposed on the same satellite or platform. Similarly, the ordinary broadcast signal 118 may be broadcast from a transmitter 124 co-located with either of the other transmitters or occupy a separate satellite 126 or platform. Also, although described above as having a single gapfiller transmitter 104, multiple gapfiller transmitters are preferred. In addition, the system may be implemented using other suitable platforms, such as high-altitude aeronautical platforms. The gapfiller signals 112 may be used to deliver any type of transmission service.

Furthermore, the gapfiller signal 112 may be transmitted in either a spotbeam (non-CONUS) or as a conventional broadcast transmission in a frequency band distinct from the broadcast and reuse transmitters. However, spotbeam transmission of the gapfiller signal 112 allows more efficient frequency re-use. Also, spotbeam transmission of a gapfiller signal 112 may be used to blanket a group of spotbeam signals 106 depending upon frequency interference considerations. In a typical embodiment, the first frequency of the signal spotbeams 106 and the CONUS broadcast signal 118 may be in the Ku band while the second frequency of the gapfiller signal 112 is in the Ka band.

FIG. 2 is a frequency table of a typical embodiment of the invention. In a typical system the frequency re-use scheme produces coverage gaps between spotbeam signal 106 coverage regions. In these gaps either none or only a limited number of the spotbeam signal 106 frequencies can be received, limited in part by concerns of interference from signals transmitted to adjacent spotbeam signal 106 regions. In the example provided in FIG. 2, a total of six spotbeam signal 106 frequencies (channels 4, 12, 18, 20, 26 and 28) are in "re-use", however, no more than two of the six re-use frequencies are typically delivered to any particular geographic coverage region.

The existing receivers 110 can tune and receive all frequencies in the band, thirty-two for the example implementation described herein (twenty-six CONUS signals 118 and six spotbeam signals 106, all in the Ku-band). The LNBs of the existing receivers 110 can be modified to receive any additional frequency band(s), e.g. a Ka band, through the use of a special LNB/combiner 300 which redirects the additional frequency band(s) to the appropriate intermediate frequency channel locations.

Figure 3:
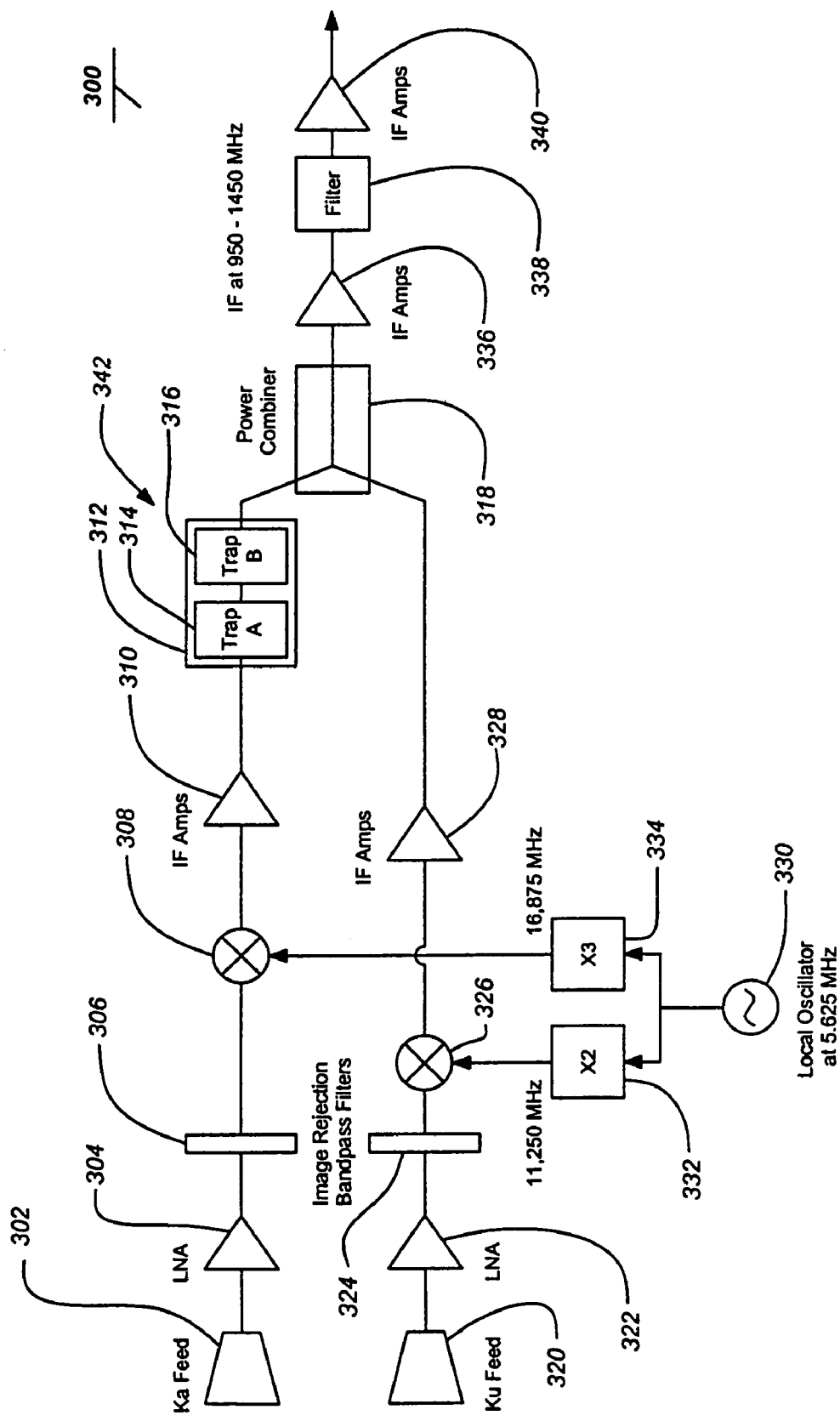
FIG. 3 illustrates a typical embodiment of a LNB/combiner of the invention.

FIG. 3 illustrates one embodiment of a LNB/combiner 300 of the invention. A first feed 320 (Ku-band in the example) receives the spotbeam signal(s) 106 along with the ordinary CONUS signals and a second feed 302 (Ka-band in the example) receives the additional gapfiller signal 112. The low noise amplifiers (LNAs) 304, 322 and image rejection bandpass filters 306, 324 couple the signals to the mixers 308, 326.

In a further aspect of the invention a single local oscillator (LO) 330 is used to generate a local oscillator signal (LOS) which is coupled to separate multiplers 334, 332. This approach lowers cost and assures that the spectra are properly aligned at the power combiner 318. The multiplier outputs are coupled to the mixers 308, 326 with the signals from the first feed 320 and second feed 302 producing respective intermediate frequencies (IF) signals. For a specific example, FIG. 2 shows the resultant IF signals which may then be amplified by IF amps 310, 328.

It is not necessary for the spotbeam signals and ordinary CONUS signals and the inserted gapfiller signals to be produced at precisely the same frequency band center spacing, as typical low-cost receivers can quickly acquire the signals. Eliminating these differences in the frequency band center spacing would require more complex multiplex chains and higher costs than necessary.

In a further aspect of the invention, a filter 342 including one or more bandstop filters or "traps" 314, 316 are used in the second feed 302 leg, corresponding to the inserted Ka-band signal in the example. The traps 314, 316, which are similar in function and design to the traps used in coaxial cable television systems, prevent an inserted gapfiller signal from interfering with other signals at the same IF frequency from the first feed 320. In an alternate embodiment, bandpass filters may be used on the first feed 320 leg, corresponding to the Ku-band signal in the example, to similarly prevent signal interference. The traps 314, 316 may be conveniently used as interchangeable and replaceable modules in a single housing 312. The traps 314, 316 are inserted by the feed/LNB installer. As a fail-safe measure, the equipment may be shipped without traps 314, 316 installed. Thus, the second feed 302 would have no effect until specifically activated by installing the traps 314, 316.

In a typical embodiment two trap 314, 316 modules are used to physically complete the circuit. The values of Trap A 314 and Trap B 316 are dictated by the spotbeam frequency plan. The installer may refer to a table listing the required traps for each zip code and/or supplemental service. Where no spotbeam coverage exists, the trap 314, 316 module functions as merely a short.

In addition, traps 314, 316 may also be used in the first feed 320 leg (Ku-band) or in any number of additional legs operating in other frequency bands. The system described by the foregoing example may be generally used to individually customize services received by a user. Customization may be desirable for a number of different reasons, such as user preferences or to screen out unpaid services for example. If a particular customer did not desire the first feed 320 Ku spot beam service they may be provided with the second feed 302 Ka service at the same IF frequency. In this instance, traps are necessary in the first leg 320.

Figure 4:
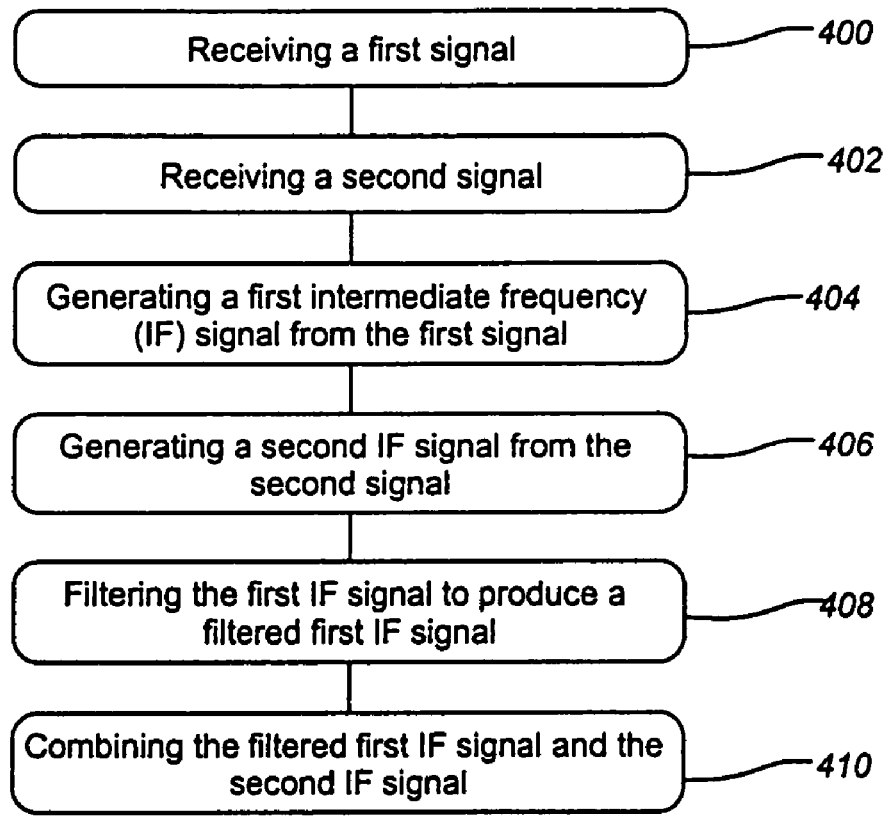
FIG. 4 illustrates a flowchart showing a method used to practice a receiving embodiment of the present invention.

FIG. 4 is a flow chart showing a method used to practice a receiving embodiment of the present invention. The method comprises the steps of receiving a first signal 400 and receiving a second signal 402. A first IF signal is generated from the first signal 404 and a second IF is generated from the second signal 406. The second IF is filtered 408 and then the filtered second IF and the first IF signal are combined 410. The filter may use trap filters 314, 316 to prevent interference between signals in the two legs occupying a common frequency.

Figure 5:
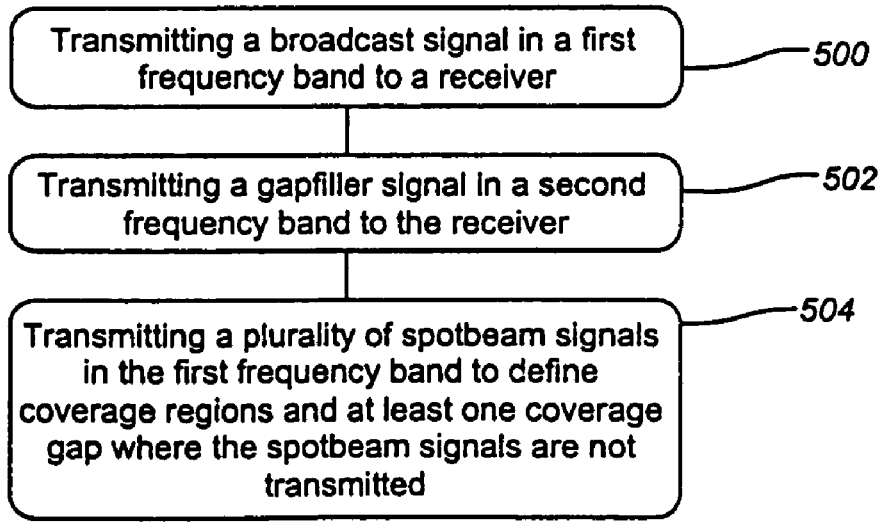
FIG. 5 illustrates a flowchart showing a method used to practice a transmitting embodiment of the present invention.

FIG. 5 is a flow chart showing a method used to practice a transmitting embodiment of the present invention. The method comprises the steps of transmitting 500 a broadcast signal in a first frequency band to a receiver 110 and transmitting 502 a gapfiller signal 112 in a second frequency band to the receiver 110 and transmitting 504 a plurality of spotbeam signals 106 in a the first frequency band to define coverage regions and at least one coverage gap 112 where the spotbeam signals 106 are not transmitted

CONCLUSION

This concludes the description of the preferred embodiments of the present invention. In summary, the present invention describes a system, apparatus and method for transmitting and receiving diverse signals across regions with improved frequency re-use and an evolutionary path to greater capacity delivery to legacy equipment while minimizing the cost to upgrade existing equipment. In more advanced applications, the invention also provides backward-compatible gapfiller capacity within the spotbeam regions.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the scope of the invention, the invention resides in the claims hereinafter appended.

What is claimed is:

1. A device for receiving signals from a transmission system, said system including a broadcast transmitter and a gapfiller transmitter, said device comprising:
    a first feed receiving a first signal in a first frequency band from a broadcast transmitter;
    a second feed receiving a second signal in a second frequency band from a gapfiller transmitter;
    a local oscillator producing a local oscillator signal;
    a first multiplier coupled to the local oscillator for multiplying the local oscillator signal by a first factor producing a first multiplied signal;
    a second multiplier coupled to the local oscillator for multiplying the local oscillator signal by a second factor producing a second multiplied signal;
    a first mixer for mixing the first multiplied signal with the first signal producing a first intermediate frequency (IF) signal;
    a second mixer for mixing the second multiplied signal with the second signal producing a second IF signal wherein the first IF signal and the second IF signal each include at least one channel having a common IF center frequency;
    a filter for filtering the second IF signal producing a filtered second IF signal; and
    a combiner for combining the filtered second IF signal and the first IF signal.

2. The device of claim 1, wherein the first feed and the second feed each receive a signal from different satellites.

3. The device of claim 1, wherein the filter comprises at least one trap filter to prevent interference with the second IF signal.

4. The device of claim 3, wherein the filter further comprises a housing and the at least one trap filter is a removeable module.

5. The device of claim 3, wherein the at least one filter is selected based upon regional and service requirements.

\* \* \* \* \*